United States Patent
Oda et al.

(10) Patent No.: US 8,830,942 B2
(45) Date of Patent: Sep. 9, 2014

(54) MOBILE EQUIPMENT AND PACKET FILTERING METHOD

(71) Applicant: Fujitsu Limited, Kawasaki (JP)

(72) Inventors: Masaya Oda, Fukuoka (JP); Akihiro Sato, Fukuoka (JP); Daisuke Kobayashi, Kasuya (JP); Shingo Hironaka, Kawasaki (JP); Hidekazu Makino, Fukuoka (JP); Yuichiro Oishi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 13/623,997

(22) Filed: Sep. 21, 2012

(65) Prior Publication Data

US 2013/0016685 A1     Jan. 17, 2013

Related U.S. Application Data

(63) Continuation of application No. PCT/JP2010/055275, filed on Mar. 25, 2010.

(51) Int. Cl.
*H04W 4/00* (2009.01)
*H04L 12/28* (2006.01)

(52) U.S. Cl.
USPC ............................................ 370/329; 370/389

(58) Field of Classification Search
CPC ..... H04W 72/04; H04W 88/08; H04W 76/00; H04W 84/12; H04W 80/04; H04W 80/18; H04W 88/06; H04W 74/08
USPC .......... 370/328, 338, 359, 419, 463, 464–465
See application file for complete search history.

(56) References Cited

U.S. PATENT DOCUMENTS 7,383,048 B2 *   6/2008   Jouppi et al. ................ 455/452.2
7,492,787 B2 *   2/2009   Ji et al. .......................... 370/466

(Continued)

FOREIGN PATENT DOCUMENTS

JP     2005-522914     7/2005
JP     2008-311974     12/2008

(Continued)

OTHER PUBLICATIONS

International Search Report dated Jun. 29, 2010, from corresponding International Application No. PCT/JP2010/055275.

(Continued)

*Primary Examiner* — Warner Wong
(74) *Attorney, Agent, or Firm* — Katten Muchin Rosenman LLP

(57) ABSTRACT

Mobile equipment includes a second control unit connected to a plurality of first control units performing control of an application function. The second control unit includes a storage unit, a setting unit, a transmitting unit, and a selecting unit. The storage unit stores selection information and connecting-destination specifying information associating each other. The setting unit sets the connecting-destination specifying information for a connecting-destination connected with the mobile equipment via a connection between the mobile equipment and a communication network. The transmitting unit transmits the connecting-destination specifying information set by the setting unit to the first control unit having the application being an establishment requestor of the connection. The selecting unit selects the connection for transferring user data based on the connecting-destination specifying information of the user data when the user data is received from the first control unit having the application being the establishment requestor of the connection.

3 Claims, 14 Drawing Sheets

(56) References Cited

U.S. PATENT DOCUMENTS

| | | |
|---|---|---|
| 7,643,456 B2 | 1/2010 | Jouppi et al. |
| 8,107,457 B2 * | 1/2012 | White et al. ............... 370/350 |
| 2002/0114305 A1 * | 8/2002 | Oyama et al. ............... 370/338 |
| 2002/0120749 A1 * | 8/2002 | Widegren et al. ............ 709/227 |
| 2003/0081607 A1 * | 5/2003 | Kavanagh ................... 370/392 |
| 2005/0053070 A1 | 3/2005 | Jouppi |
| 2007/0076690 A1 | 4/2007 | Dyck et al. |
| 2007/0081499 A1 * | 4/2007 | Johnsen ...................... 370/335 |
| 2008/0310334 A1 | 12/2008 | Nakamura et al. |
| 2009/0213792 A1 * | 8/2009 | Lee ............................. 370/328 |
| 2011/0035495 A1 * | 2/2011 | Ekstrom et al. ............. 709/225 |
| 2011/0122886 A1 * | 5/2011 | Willars et al. ............... 370/412 |

FOREIGN PATENT DOCUMENTS

| | | |
|---|---|---|
| JP | 2009-512254 | 3/2009 |
| WO | 03/085904 | 10/2003 |
| WO | 2007/041316 | 4/2007 |

OTHER PUBLICATIONS

3GPP TS23.401 V9.3.0, (Dec. 2009), Release 9, pp. 39-42, Dec. 2009.

* cited by examiner

FIG.5

| EPS BEARER NUMBER | PDN NAME | PDN NUMBER | PACKET FILTER TABLE ID |
|---|---|---|---|
| 10 | X | 10 | 1 |
| 11 | X | 10 | 1 |
| 12 | X | 10 | 1 |
| 5 | Y | 20 | 2 |
| 6 | Z | 30 | 3 |

FIG.6

| PDN NAME | PDN NUMBER |
|---|---|
| X | 10 |
| Y | 20 |
| Z | 30 |

FIG.7

| PDN NAME | PACKET FILTER TABLE ID |
|---|---|
| 10 | 1 |
| 20 | 2 |
| 30 | 3 |

FIG.8

| | | ID = 1 | |
|---|---|---|---|
| ENTRY NUMBER | PRIORITY | FILTER CONDITION | TRANSMITTING-DESTINATION EPS BEARER NUMBER |
| 1 | 1 | DESTINATION IP ADDRESS = 20.10.10.0/24 | 10 |
| 2 | 2 | DESTINATION IP ADDRESS = 20.10.10.1/24 | 11 |
| 3 | 3 | DESTINATION TCP PORT NUMBER = 200 | 12 |

FIG.9

| | | ID = 2 | |
|---|---|---|---|
| ENTRY NUMBER | PRIORITY | FILTER CONDITION | TRANSMITTING-DESTINATION EPS BEARER NUMBER |
| 1 | 1 | DESTINATION IP ADDRESS = 30.10.10.0/24 | 5 |

FIG.10

| | | ID = 3 | |
|---|---|---|---|
| ENTRY NUMBER | PRIORITY | FILTER CONDITION | TRANSMITTING-DESTINATION EPS BEARER NUMBER |
| 1 | 1 | DESTINATION IP ADDRESS = 10.10.10.1/24 | 6 |

FIG.11

| PDN NAME | PDN NUMBER |
|---|---|
| X | 10 |
| Y | 20 |
| Z | 30 |

MOBILE EQUIPMENT AND PACKET FILTERING METHOD

CROSS-REFERENCE TO RELATED APPLICATION

This application is a continuation of International Application No. PCT/JP2010/055275, filed on Mar. 25, 2010, the entire contents of which are incorporated herein by reference.

FIELD

The embodiments discussed herein are directed to mobile equipment, a packet filtering method, and a packet filtering program.

BACKGROUND

Currently, standardization of communication specification named long term evolution (LTE) is proceeding targeting actualization of high speed data communication with a mobile communication network utilizing a cellular phone and the like.

In a network which utilizes the LTE as the communication specification, a communication path for transferring user data, that is, an evolved packet system (EPS) bearer, is established for each quality of service (QOS) between mobile equipment such as a cellular phone and the network. Further, the mobile equipment has a packet filter for determining the EPS bearer through which user data is to be transferred for each connecting service (PDN: packet data network).

When the user data to be a transfer object is obtained, the mobile equipment extracts information such as an internet protocol (IP) header, a transmission control protocol (TCP) header, and a user datagram protocol (UDP) header provided to the user data. Then, the mobile equipment determines the EPS bearer through which the user data is to be transferred as comparing the extracted information to the packet filter. In mobile equipment, a method to determine an EPS bearer through which user data is to be transferred based on a packet filter provided for each service is called a packet filter function. The packet filter function is standard specification defined by the third generation partnership project (3GPP), which is a standard-setting organization of communication specification.

Further, in the 3GPP, the abovementioned mobile equipment is divided into a terminal equipment (TE) and a mobile termination (MT). The TE performs control of an application function and is connected to a plurality of services (PDN: packet data network) via the MT. Here, the TE includes an internal TE existing at the inside of the mobile equipment and an external TE connected to the MT via an external device such as a universal serial bus (USB). Further, the MT performs communication protocol control between user equipment (UE) and a network (NW), that is, between the mobile equipment and the network.

Further, as described above, the packet filter function is to determine an EPS bearer through which user data is to be transferred based on an IP header, a TCP header, and a UDP header. Accordingly, in general, the packet filter function is provided to the TE side on which an IP layer is mounted.

For example, see Japanese National Publication of International Patent Application No. 2009-512254, and Japanese National Publication of International Patent Application No. 2005-522914.

FIG. 24 is a view illustrating an example of a configuration of traditional mobile equipment. As illustrated in FIG. 24, in a case that mobile equipment UE performs communication control of a plurality of TEs such as an internal TE and an external TE, a packet filter would be provided to each TE. However, owing to a reason described below, it is not realistic to provide a packet filter to each TE. Here, the internal TE is a TE arranged at the inside of the mobile equipment and the external TE is an information processing device such as a personal computer and a server functioning as the TE as being externally connected to the mobile equipment via a USB and the like, for example.

Since a packet filter is generally mounted by each vendor who performs development of a TE, it is just conceivable that each vendor mount a packet filter on a TE in a different way. For example, it is conceivable that an interface connecting an internal TE and the MT and an interface connecting an external TE and the MT are different owing to that the internal TE and the external TE are developed respectively by a different vendor. In this case, since functional difference of the interfaces is absorbed at the MT side, there is a fear that a configuration of the mobile equipment becomes complicated. Accordingly, it is not a realistic method to provide the packet filter to the TE side.

Here, as a technology relating to the abovementioned packet filter function, a technology to provide a single packet filter to an MT side has been proposed, for example. Further, there has been proposed a technology that an EPS bearer is determined at a network side for transferring user data from the network side to mobile equipment by using a packet filter and a policy enforcement point (PEP), which is specific to the network accommodating the mobile equipment, and the like.

As described above, in a case of performing communication being compliant to the 3GPP standard specification, a packet filter table would be prepared for each service (PDN: packet data network) to which the mobile equipment is connected. However, the technology to provide a single packet filter to the abovementioned MT side is not intended to be used originally in a case that a packet filter table is provided for each service to be connected from mobile equipment. Therefore, any solution is not proposed for a problem which may occur in a case of providing a plurality of packet filters to respective TEs.

Further, with the technology to determine an EPS bearer in a case that user data is transferred to mobile equipment from the abovementioned network side, the EPS bearer can be determined at the time of filtering with the PEP owing to that mapping between the PEP and the packet filter function is uniquely performed. That is, it is an object to improve processing redundancy by resolving duplicate filtering processes performed by the PEP and the packet filter function in a case that the user data is transferred from the network side to the mobile equipment. Therefore, the technology does not propose any solution for a problem which may occur in a case of providing a plurality of packet filters to respective TEs.

SUMMARY

According to an aspect of an embodiment, mobile equipment includes a second control unit. The second control unit is connected to a plurality of first control units performing control of an application function. The second control unit performs communication protocol control between the mobile equipment and a communication network. The second control unit includes a storage unit that stores selection information for selecting a connection to be used for transferring user data received from the first control unit in accordance with a transmitting-destination of the user data among a plurality of virtual connections established between the mobile equipment and the communication network and connecting-destination specifying information for uniquely specifying a connecting-destination to be the transmitting-destination of the user data, the storage unit associating the selection information and the connecting-destination specifying information with each other; a setting unit configured to set, when a connection is established between the mobile equipment and the communication network, the connecting-destination specifying information for a connecting-destination to be connected with the mobile equipment via the established connection; a transmitting unit that transmits the connecting-destination specifying information set by the setting unit to the first control unit having an application being an establishment requestor of the connection; and a selecting unit that obtains from the storage unit, when user data with a predetermined connecting-destination being a transmitting-destination is received from the first control unit having the application being the establishment requestor of the connection, the selection information associated with the connecting-destination specifying information provided to the user data, and selects a connection based on the obtained selection information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a view illustrating an example of a configuration of a call management table according to the second embodiment;

FIG. 6 is a view illustrating an example of a configuration of a PDN management table according to the second embodiment;

FIG. 7 is a view illustrating an example of a configuration of a packet filter determination table according to the second embodiment;

FIG. 8 is a view illustrating an example of a configuration of a packet filter table according to the second embodiment;

FIG. 9 is a view illustrating an example of a configuration of a packet filter table according to the second embodiment;

FIG. 10 is a view illustrating an example of a configuration of a packet filter table according to the second embodiment;

FIG. 11 is a view illustrating an example of a configuration of a PDN number providing table according to the second embodiment;

DESCRIPTION OF EMBODIMENTS

In the following, an embodiment of mobile equipment, a packet filtering method, and a packet filtering program disclosed in the present application will be described in detail with reference to the drawings. Here, in the following, technologies disclosed in the present application are not limited by examples described below as the embodiments of the mobile equipment, the packet filtering method, and the packet filtering program disclosed in the present application.

[a] First Embodiment

Figure 1:
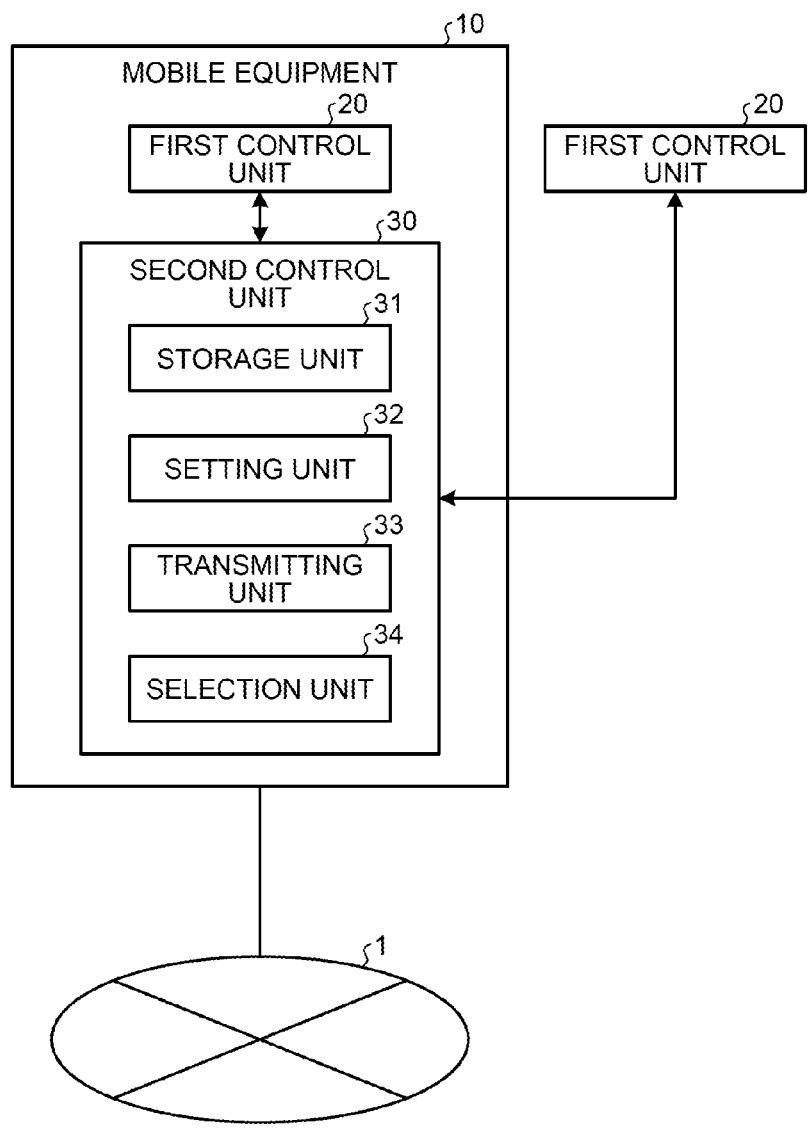
FIG. 1 is a view illustrating mobile equipment according to a first embodiment.

FIG. 1 is a view illustrating mobile equipment according to a first embodiment. As illustrated in FIG. 1, mobile equipment 10 according to the first embodiment includes a second control unit 30 connected to a first control unit 20 which performs control of an application function.

As illustrated in FIG. 1, the second control unit 30 includes a storage unit 31, a setting unit 32, a transmitting unit 33 and a selection unit 34. The storage unit 31 stores selection information and connecting-destination specifying information as associating each other. The selection information is information for selecting a connection to be used for transferring user data received from the first control unit 20 in accordance with a transmitting-destination of the user data among a plurality of virtual connections established between the mobile equipment 10 and a communication network 1. The connecting-destination specifying information is information for uniquely specifying a connecting-destination to be a transmitting-destination of the user data.

The setting unit 32 sets the connecting-destination specifying information regarding a connecting-destination to be connected with the mobile equipment 10 via a connection in a case that the connection is established against the communication network 1. The transmitting unit 33 transmits the connecting-destination specifying information which is set by the setting unit 32 to the first control unit 20 which has an application being an establishment requestor of the connection. The selection unit 34 selects a connection to be used for transferring the user data in a case that the user data is received from the first control unit 20 which has the application being the establishment requestor of the connection. For example, the selection unit 34 obtains the selection information associated with the connecting-destination specifying information included in the user data from the storage unit 31 and selects a connection based on the obtained selection information.

As described above, the second control unit 30 obtains the information for selecting the connection to be used for transferring the user data received from the first control unit 10 in accordance with the transmitting-destination of the user data as aggregating for each connecting-destination at the time of user data transferring. Then, the second control unit 30 selects a connection for transferring the user data owing to obtaining the abovementioned selection information having the connecting-destination specifying information provided to the user data received from the first control unit 20 as a key. With the above, the mobile equipment 10 according to the first embodiment can perform appropriate communication control without complicating a mobile equipment configuration even in a case that communication control is performed for a plurality of the first control units 20, for example.

[b] Second Embodiment

Configuration of Mobile Equipment (Second Embodiment)

Figure 2:
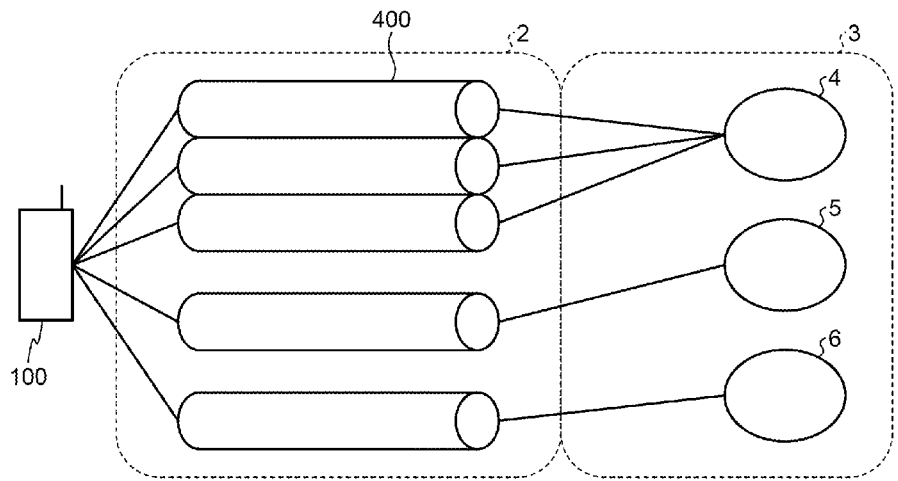
FIG. 2 is a view illustrating a network configuration according to a second embodiment.

FIG. 2 is a view illustrating a network configuration according to a second embodiment. As illustrated in FIG. 2, mobile equipment 100 is connected to connecting-destinations 4, 5, 6 and the like accommodated in an IP network 3 via a plurality of evolved packet system (EPS) bearers 400 established in a wireless network 2. The mobile equipment 100 establishes the EPS bearer 400 against the IP network 3 in accordance with a call establishment request from an application provided to a TE. Here, the EPS bearer 400 is a connection for communication established for each of the connecting-destinations 4 to 6 accommodated in the IP network 3. The connecting-destinations 4 to 6 respectively offer a predetermined service corresponding to the application provided to the TE.

Figure 3:
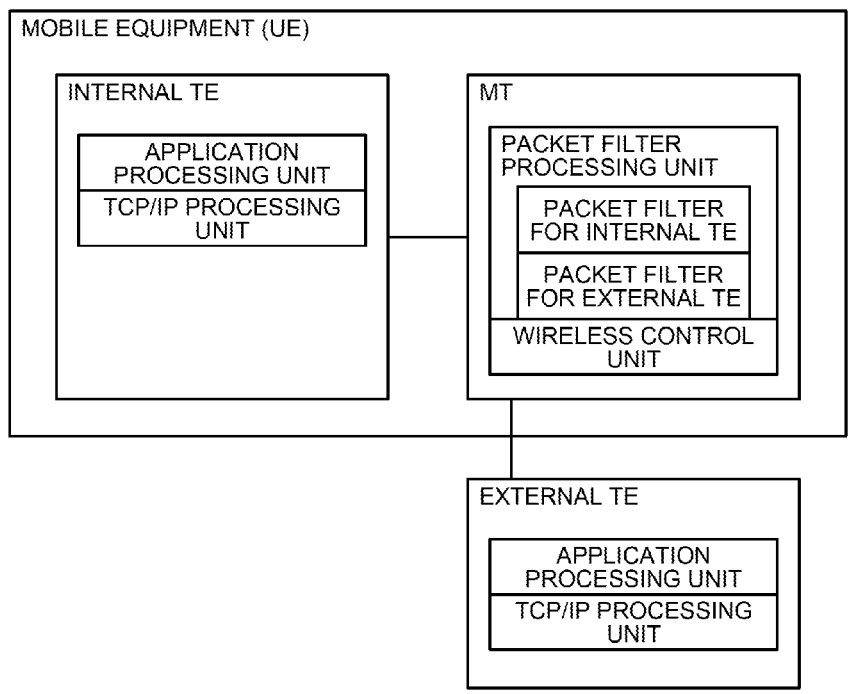
FIG. 3 is a schematic view illustrating a functional configuration of the mobile equipment according to the second embodiment.

FIG. 3 is a schematic view illustrating a functional configuration of the mobile equipment according to the second embodiment. As illustrated in FIG. 3, the mobile equipment user equipment (UE) includes an internal terminal equipment (TE) and a mobile termination (MT). Further, the MT is connected to an external TE via a universal serial bus (USB) or the like.

Each of the internal TE and the external TE includes an application processing unit and a transmission control protocol/internet protocol (TCP/IP) processing unit. The MT includes a packet filter processing unit and a wireless control unit. Then, the packet filter processing unit includes a packet filter table for the internal TE for transferring the user data to be received from the internal TE and a packet filter table for the external TE for transferring the user data to be received from the external TE in a state of an aggregated state.

Here, only the internal TE and the external TE are illustrated in FIG. 3. However, not limited to this, the mobile equipment UE may further include a plurality of internal TEs and may be further connected to a plurality of external TEs. In the following, a configuration of the mobile equipment according to the second embodiment will be described in detail.

Figure 4:
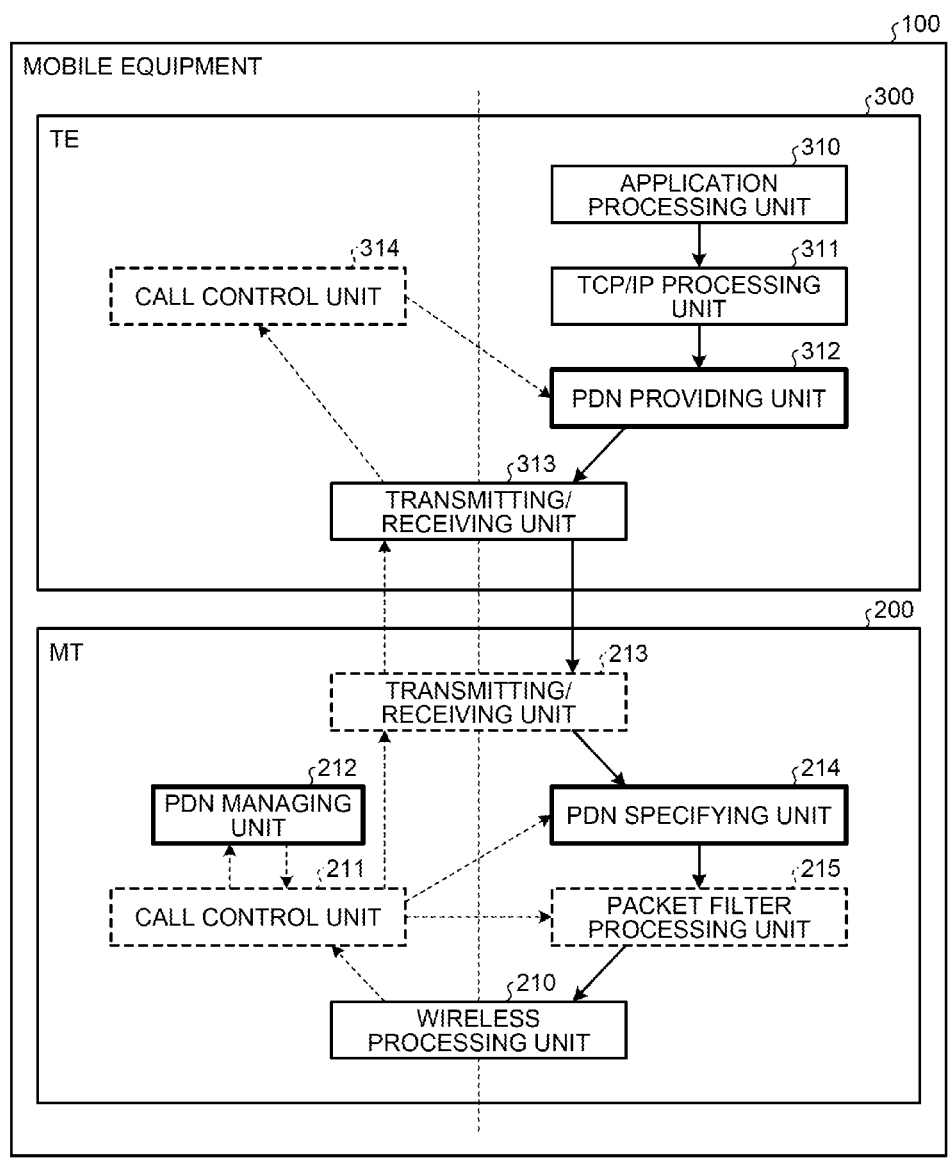
FIG. 4 is a view illustrating a configuration of the mobile equipment according to the second embodiment.

FIG. 4 is a view illustrating a configuration of the mobile equipment according to the second embodiment. As illustrated in FIG. 4, the mobile equipment 100 according to the second embodiment includes an MT 200 and a TE 300.

As illustrated in FIG. 4, the MT 200 includes a wireless processing unit 210, a call control unit 211, a packet data network (PDN) managing unit 212, a transmitting/receiving unit 213, a PDN specifying unit 214 and a packet filter processing unit 215.

The wireless processing unit 210 establishes an EPS bearer against the IP network 3 in accordance with a call establishment request from the TE 300. Then, the wireless processing unit 210 transmits the user data via the EPS bearer established against the IP network 3.

Further, the wireless processing unit 210 transmits a call establishment notification to the call control unit 211 when the call establishment notification is received from the IP network 3. Here, the call establishment notification includes an EPS bearer number, a PDN name, a packet filter entry ID, and a packet filter entry.

Further, when a user data transmission request is received from the packet filter processing unit 215, the wireless processing unit 210 transmits the user data included in the user data transmission request via the EPS bearer which corresponds to the EPS bearer number included in the user data transmission request.

When the call establishment notification is received from the wireless processing unit 210, the call control unit 211 sets the EPS bearer number and the PDN name included in the call establishment notification at a call management table. Next, the call control unit 211 determines whether or not a PDN name which is the same as the PDN name included in the call establishment notification exists at the call management table. In a case that the same PDN name exists at the call management table as a result of the determination, the call control unit 211 obtains the PDN number and the packet filter table ID associated with the corresponding PDN name from the call management table.

Subsequently, the call control unit 211 sets the PDN number and the packet filter table ID obtained from the call management table as associating with the EPS bearer number and the PDN name previously set at the call management table. After setting the call management table, the call control unit 211 transmits a packet filter setting request to the packet filter processing unit 215. The packet filter setting request is to request additional setting of the EPS bearer number, the packet filter entry ID, and the packet filter entry included in the call establishment request at the packet filter table corresponding to the PDN.

Next, the call control unit 211 generates the call establishment notification for transmitting to the TE 300. Then, the call control unit 211 transmits the call establishment notification transmission request to the transmitting/receiving unit 213. In a case that the same PDN name as the PDN name included in the call establishment notification exists at the call management table, since correspondence relation between the PDN name and the PDN number already exists at the TE 300 side, only call establishment is notified.

On the other hand, in a case that the same PDN name does not exist as a result of the determination, the call control unit 211 transmits a new PDN number obtainment request to the PDN managing unit 212. When a new PDN number is received from the PDN managing unit 212, the call control unit 211 generates the call establishment notification to the TE 300 after performing a new PDN number obtaining process. At that time, the call control unit 211 generates the call establishment notification including the new PDN number as the call establishment notification for transmitting to the TE 300. Then, the call control unit 211 transmits the call establishment notification transmission request to the transmitting/receiving unit 213. Here, the call control unit 211 inserts the PDN number and the PDN name into the call establishment notification to be transmitted to the TE 300 in accordance with the new PDN number obtaining process. It is also possible to insert other information notified from the IP network 3 side.

The new PDN number obtaining process which is performed by the call control unit 211 will be described. When the new PDN number is received from the PDN managing unit 212, the call control unit 211 generates an ID to be provided to a newly-generated packet filter table by the packet filter processing unit 215 for performing packet filtering on the new PDN. Then, the call control unit 211 sets the new PDN number and the newly-generated packet filter table ID as associating with the EPS bearer number and the PDN name previously set at the call management table.

After setting to the call management table, the call control unit 211 transmits a PDN information setting request including the newly-generated packet filter ID and the PDN number to the PDN specifying unit 214. Further, the call control unit 211 transmits a packet filter table setting request to the packet filter processing unit 215. The packet filter table setting request includes the newly-generated packet filter ID, the EPS bearer number, the packet filter entry ID, and the packet filter entry. Then, the packet filter table setting request is to request the packet filter processing unit 215 to generate a new packet filter table which is associated with the new packet filter ID. The EPS bearer number, the packet filter entry ID and the packet filter entry are newly set at the newly-generated packet filter table. In this manner, the call control unit 211 completes the new PDN number obtaining process.

FIG. 5 is a view illustrating an example of a configuration of the call management table according to the second embodiment. As described above, various kinds of information included in the call establishment notification are set at the call management table by the call control unit 211. As illustrated in FIG. 5, the EPS bearer number, the PDN name, the PDN number and the packet filter table ID are set at the call management table in an associated state.

Here, the EPS bearer number is an identification number which is uniquely provided by the IP network 3 for each EPS bearer established against the IP network 3. Further, the PDN name is a name of a PDN which is uniquely determined based on an IP address and an access point name (APN) allocated to the mobile equipment 100 by the IP network 3. Further, the PDN number is an identification number which is uniquely provided by the MT 200 for each PDN described above. The packet filter table ID is an identification number which is uniquely provided by the MT 200 to the packet filter table including the packet filter entry for selecting the EPS bearer in accordance with the transmitting-destination of the user data.

For example, as illustrated in FIG. 5, an EPS bearer number "10", a PDN name "X", a PDN number "10" and a packet filter table ID "1" are set at the first row of a call management table in an associated state. Further, an EPS bearer number "11", a PDN name "X", a PDN number "10" and a packet filter table ID "1" are set at the second row of the call management table in an associated state. Further, an EPS bearer number "12", a PDN name "X", a PDN number "10" and a packet filter table ID "1" are set at the third row of the call management table in an associated state. Further, an EPS bearer number "5", a PDN name "Y", a PDN number "20" and a packet filter table ID "2" are set at the fourth row of the call management table in an associated state. Furthermore, an EPS bearer number "6", a PDN name "Z", a PDN number "30" and a packet filter table ID "3" are set at the fifth row of the call management table in an associated state.

The call control unit 211 internally includes a storage unit and stores the call management table in the storage unit. For example, the storage unit is a semiconductor memory element such as a random access memory (RAM) and a flash memory.

When a new PDN number obtaining request is received from the call control unit 211, the PDN managing unit 212 newly generates a unique PDN number with reference to the PDN management table. Next, the PDN managing unit 212 sets the PDN name included in the new PDN number obtaining request and the new PDN number at the PDN management table as associating each other. Then, the PDN managing unit 212 transmits the new PDN number to the call control unit 211 as a response to the new PDN number obtaining request.

For example, in a case that the PDN numbers "10" and "20" are previously set at the PDN management table, the PDN managing unit 212 generates a new PDN number "30" which is not duplicate to the PDN numbers "10" and "20" in accordance with a predetermined algorithm. Then, for example, the PDN managing unit 212 sets the new PDN number "30" and the PDN name "Z" included in a new PDN number obtaining notification at the PDN management table.

FIG. 6 is a view illustrating an example of a configuration of the PDN management table according to the second embodiment. The PDN name and the PDN number are set at the PDN management table in as associated state. For example, as illustrated in FIG. 6, the PDN name "X" and the PDN number "10" are set at the first row of the PDN management table in an associated state. Further, the PDN name "Y" and the PDN number "20" are set at the second row of the PDN management table in an associated state. Further, the PDN name "Z" and the PDN number "30" are set at the third row of the PDN management table in an associated state.

The PDN managing unit 212 internally includes a storage unit and stores the PDN management table in the storage unit. For example, the storage unit is a semiconductor memory element such as a random access memory (RAM) and a flash memory.

When the call establishment notification is received from the call control unit 211, the transmitting/receiving unit 213 transmits the call establishment notification to the TE 300. Further, when the user date is received from the TE 300, the transmitting/receiving unit 213 transmits the user data to the PDN specifying unit 214.

When the PDN information setting request is received from the call control unit 211, the PDN specifying unit 214 sets the PDN number and the packet filter table ID included in the PDN information setting request at a packet filter determination table as associating each other.

FIG. 7 is a view illustrating an example of a configuration of the packet filter determination table according to the second embodiment. The PDN number and the packet filter table ID are set at the packet filter determination table in an associated state. For example, as illustrated in FIG. 7, a PDN number "10" and a packet filter table ID "1" are set at the first row of the packet filter determination table in an associated state. Further, a PDN number "20" and a packet filter table ID "2" are set at the second row of the packet filter determination table in an associated state. Furthermore, a PDN number "30" and a packet filter table ID "3" are set at the third row of the packet filter determination table in an associated state.

The PDN specifying unit 214 internally includes a storage unit and stores the packet filter determination table in the storage unit. For example, the storage unit is a semiconductor memory element such as a random access memory (RAM) and a flash memory.

Further, when the user data is received from the transmitting/receiving unit 213, the PDN specifying unit 214 obtains the PDN number provided to the user data. Next, the PDN specifying unit 214 obtains the packet filter table ID associated with the obtained PDN number from the packet filter determination table. Then, the PDN specifying unit 214 transmits a packet filter request to the packet filter processing unit 215.

When the packet filter setting request is received, the packet filter processing unit 215 obtains the packet filter table ID included in the packet filter setting request. Next, the packet filter processing unit 215 determines whether or not the packet filter table corresponding to the obtained packet filter table ID exists.

In a case that the packet filter table exists as a result of the determination, the packet filter processing unit 215 additionally sets the EPS bearer number, the packet filter table ID and the packet filter entry included in the packet filter setting request at the corresponding packet filter table. Here, the packet filter entry includes a priority of filtering, filter conditions and the transmitting-destination EPS bearer number.

On the other hand, in a case that the packet filter table does not exist, the packet filter processing unit 215 generates a new packet filter table to be associated with the packet filter table ID. Next, the packet filter processing unit 215 provides the packet filter table ID included in the packet filter setting request to the new packet filter table. Then, the packet filter processing unit 215 newly sets the EPS bearer number, the packet filter entry ID and the packet filter entry included in the packet filter setting request at the new packet filter table.

FIGS. 8 to 10 are views illustrating an example of a configuration of the packet filter table according to the second embodiment. Here, FIG. 8 indicates a packet filer table for filtering a packet to be transmitted to a PDN corresponding to the PDN name "X". Then, "ID=1" is provided to the packet filter table indicated in FIG. 8.

Further, FIG. 9 indicates a packet filter table for filtering a packet to be transmitted to a PDN corresponding to the PDN name "Y". Then, "ID=2" is provided to the packet filter table indicated in FIG. 9.

Further, FIG. 10 indicates a packet filter table for filtering a packet to be transmitted to a PDN corresponding to the PDN name "Z". Then, "ID=3" is provided to the packet filter table indicated in FIG. 10. Here, the entry number, the priority, the filter condition and the transmitting-destination EPS bearer number are set at the packet filter table in an associated state.

For example, an entry number "1", a priority "1", a filter condition "destination IP address=20.10.10.0/24", and a transmitting-destination EPS bearer number "10" are set at the first row of the packet filter table corresponding to the PDN name "X" indicated in FIG. 8 in an associated state.

Further, an entry number "2", a priority "2", a filter condition "destination IP address=20.10.10.1/24", and a transmitting-destination EPS bearer number "11" are set at the second row of the packet filter table corresponding to the PDN name "X" indicated in FIG. 8 in an associated state.

Further, an entry number "3", a priority "3", a filter condition "destination TCP port number=200", and a transmitting-destination EPS bearer number "12" are set at the third row of the packet filter table corresponding to the PDN name "X" indicated in FIG. 8 in an associated state.

Further, for example, an entry number "1", a priority "1", a filter condition "destination IP address=30.10.10.0/24", and a transmitting-destination EPS bearer number "5" are set at the packet filter table corresponding to the PDN name "Y" indicated in FIG. 9 in an associated state.

Furthermore, for example, an entry number "1", a priority "1", a filter condition "destination IP address=10.10.10.1/24", and a transmitting-destination EPS bearer number "6" are set at the packet filter table corresponding to the PDN name "Z" indicated in FIG. 10 in an associated state.

The packet filter processing unit 215 internally includes a storage unit and stores the packet filter table in the storage unit. For example, the storage unit is a semiconductor memory element such as a random access memory (RAM) and a flash memory.

Further, when the packet filter request is received from the PDN specifying unit 214, the packet filter processing unit 215 determines the EPS bearer to be the transmitting-destination of the user data. For example, the packet filter processing unit 215 obtains the packet filter table ID included in the packet filter request. Next, the packet filter processing unit 215 determines the EPS bearer number to be the transmitting-destination of the user data as comparing the filter condition of the packet filter table of the obtained table ID and the destination IP address of the user data included in the packet filter request. Then, the packet filter processing unit 215 transmits the user data transmission request to the wireless processing unit 210.

Here, the wireless processing unit 210, the call control unit 211, the PDN managing unit 212, the transmitting/receiving unit 213, the PDN specifying unit 214 and the packet filter processing unit 215 may include an electronic circuit and an integrated circuit. Examples of the electronic circuit include a central processing unit (CPU) and a micro processing unit (MPU) and examples of the integrated circuit include an application specific integrated circuit (ASIC), a field programmable gate array (FPGA), and the like.

As illustrated in FIG. 4, the TE 300 includes an application processing unit 310, a transmission control protocol/internet protocol (TCP/IP) processing unit 311, a PDN providing unit 312, a transmitting/receiving unit 313, and a call control unit 314.

The application processing unit 310 request establishment of the EPS bearer against the IP network 3 to the MT 200. Further, the application processing unit 310 generates the user data for transmitting to a predetermined connecting-destination accommodated in the IP network 3. The application processing unit 310 transmits the user data to the TCP/IP processing unit 311. Here, the application processing unit adds an IP address to be the transmitting-destination of the user data to the user data.

When the user data is received which is received from the application processing unit 310, the TCP/IP processing unit 311 stores the IP address to be the transmitting-destination of the user data in a TCP/IP header. Then, the TCP/IP processing unit 311 provides the TCP/IP header to the user data and transmits to the PDN providing unit 312.

When a PDN number notification requiring for registration of correspondence relation between the PDN name and the PDN number is received from the call control unit 314, the PDN providing unit 312 registers the PDN name and the PDN number included in the PDN number notification to the PDN number providing table as associating each other.

Further, when the user data is received from the TCP/IP processing unit 311, the PDN providing unit 312 obtains a source IP address of the user data and specifies the PDN name based on the obtained IP address. Next, the PDN providing unit 312 obtains the PDN number associated with the specified PDN name from the PDN number providing table. Then, after providing the PDN number obtained from the PDN number providing table to the user data received from the TCP/IP processing unit 311, the PDN providing unit 312 transmits the user data transmission request including the user data to which the PDN number is provided to the transmitting/receiving unit 313.

FIG. 11 is a view illustrating an example of a configuration of the PDN number providing table according to the second embodiment. The PDN name and the PDN number are set at the PDN number providing table in an associated state. For example, as illustrated in FIG. 11, the PDN name "X" and the PDN number "10" are set at the first row of the PDN number providing table in an associated state. Further, the PDN name "Y" and the PDN number "20" are set at the second row of the PDN number providing table in an associated state. Furthermore, the PDN name "Z" and the PDN number "30" are set at the third row of the PDN number providing table in an associated state.

The PDN providing unit 312 internally includes a storage unit and stores the abovementioned PDN number providing table in the storage unit. For example, the storage unit is a semiconductor memory element such as a random access memory (RAM) and a flash memory.

The transmitting/receiving unit 313 transmits the call establishment notification received from the MT 200 to the call control unit 314. Further, the transmitting/receiving unit 313 transmits the user data received from the PDN providing unit 312 to the MT 200.

When the call establishment notification is received from the transmitting/receiving unit 313, the call control unit 314 obtains the PDN name and the PDN number included in the call establishment notification and transmits to the PDN providing unit 312 the PDN number notification requesting for registration of correspondence relation between the obtained PDN name and PDN number.

Process by Mobile Equipment (Second Embodiment)

Figure 12:
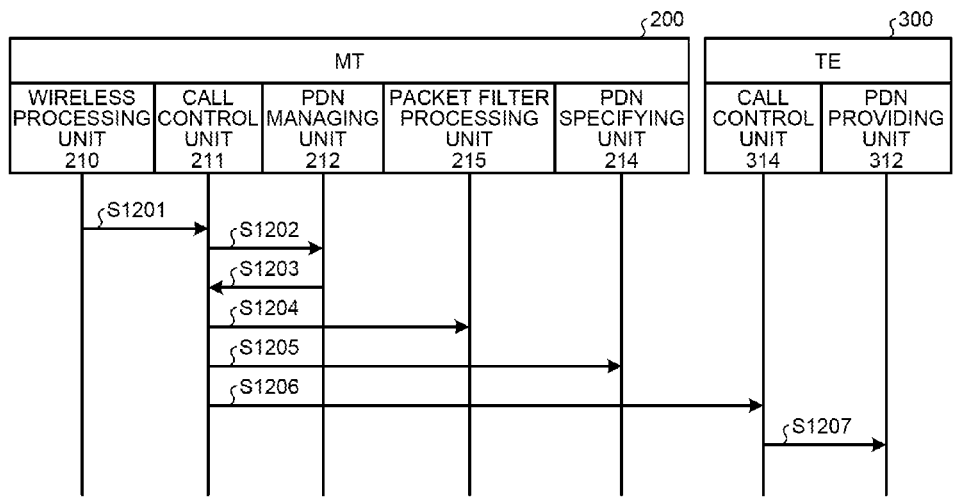
FIG. 12 is a chart illustrating a flow of an entire process of the mobile equipment according to the second embodiment.
Figure 13:
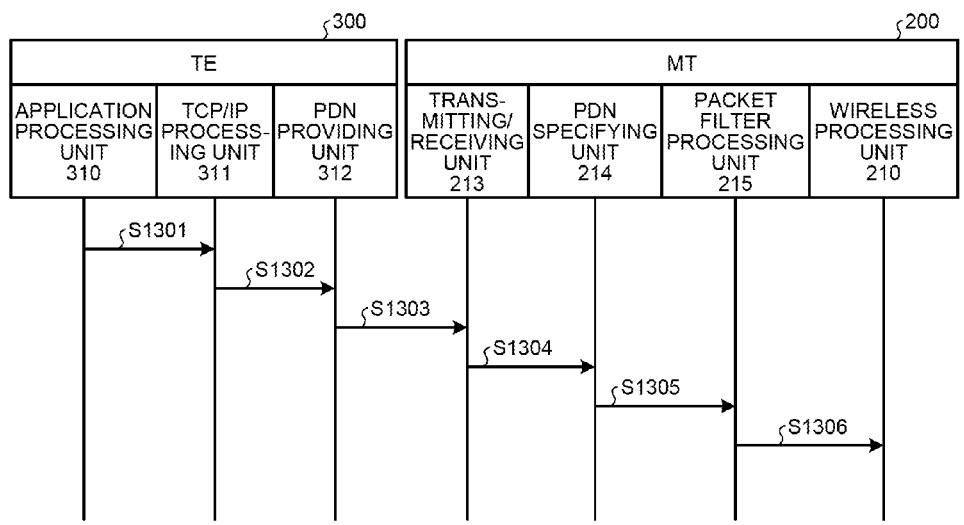
FIG. 13 is a chart illustrating a flow of an entire process of the mobile equipment according to the second embodiment.

FIGS. 12 and 13 are views illustrating a flow of the entire process by mobile equipment according to the second embodiment. First, a flow of a process of the mobile equipment 100 at the time of call establishment will be described by utilizing FIG. 12. As illustrated in FIG. 12, when the call establishment notification is received from the IP network 3, the wireless processing unit 210 transmits the PDN name and the PDN number included in the call establishment notification to the call control unit 211 (step S1201).

In a case that the PDN name included in the call establishment notification which is received from the wireless processing unit 210 does not exist in the call management table, the call control unit 211 transmits the new PDN number obtaining request to the PDN managing unit 212 (step S1202). Then, the PDN managing unit 212 transmits the new PDN number to the call control unit 211 (step S1203). When the new PDN number is received from the PDN managing unit 212, the call control unit 211 transmits the packet filter table setting request to the packet filter processing unit 215 (step S1204). Further, the call control unit 211 transmits the PDN information setting request to the PDN specifying unit 214 (step S1205). Then, the call control unit 211 generates the call establishment notification including the new PDN number and transmits to the TE 300 (step S1206).

When the call control unit 314 receives the call establishment notification from the MT 200, the call control unit 314 transmits the PDN number included in the call establishment notification to the PDN providing unit 312 (step S1207).

Next, a flow of a process of the mobile equipment 100 at the time of user data transmission will be described by utilizing FIG. 13. As illustrated in FIG. 13, the application processing unit 310 transmits the user data to the TCP/IP processing unit 311 (step S1301). The TCP/IP processing unit 311 provides the TCP/IP header which includes the IP address to be the destination of the user data to the user data received from the application processing unit 310 and transmits to the PDN providing unit 312 (step S1302). The PDN providing unit 312 provides the PDN number received from the call control unit 314 to the user data received from the TCP/IP processing unit 311 and transmits to the MT 200 (step S1303).

When the user data is received from the TE 300, the transmitting/receiving unit 213 transmits the user data to the PDN specifying unit 214 (step S1304). When the user data is received from the transmitting/receiving unit 213, the PDN specifying unit 214 obtains the packet filter table ID from the packet filter determination table and transmits the packet filter request to the packet filter processing unit 215 (step S1305). Further, when the packet filter request is received from the PDN specifying unit 214, the packet filter processing unit 215 determines the EPS bearer to be the transmitting destination of the user data and transmits the user data transmission request to the wireless processing unit 210 (step S1306).

FIGS. 14 to 22 are views illustrating flows of processes of respective process functioning units included in the mobile equipment 100 according to the second embodiment. First, a flow of a process of the call control unit 211 will be described with reference to FIGS. 14 and 15.

Figure 14:
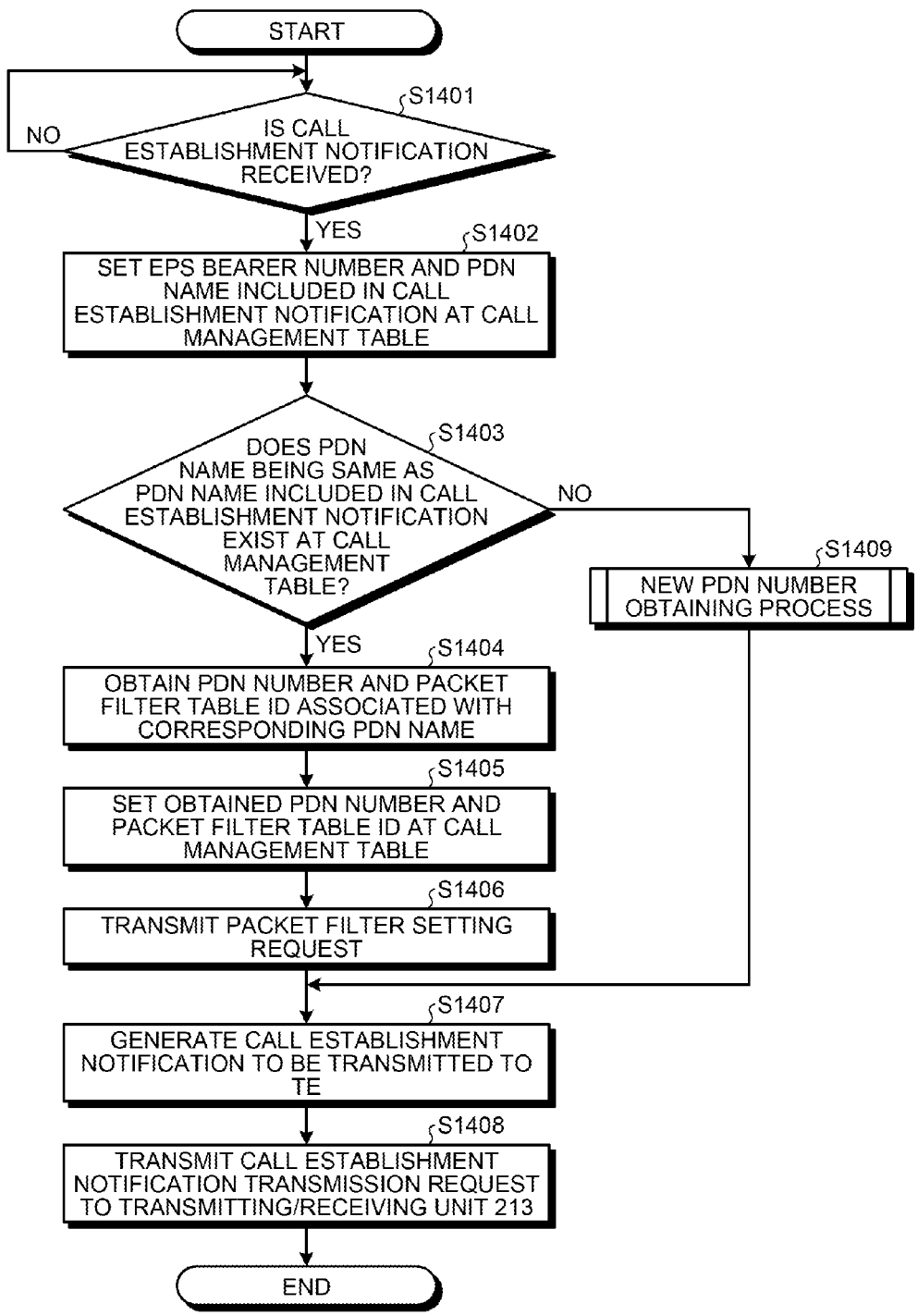
FIG. 14 is a chart illustrating a flow of a process of each process functioning unit included in mobile equipment according to the second embodiment.

As illustrated in FIG. 14, when the call establishment notification is received from the wireless processing unit 210 ("YES" in step S1401), the call control unit 211 sets the EPS bearer number and the PDN name included in the call establishment notification at the call management table (step S1402). Next, the call control unit 211 determines whether or not the PDN name which is the same as the PDN name included in the call establishment notification exists at the call management table (step S1403).

In a case that the same PDN name exists at the call management table as a result of the determination ("YES" in step S1403), the call control unit 211 obtains the PDN number and the packet filter table ID associated with the corresponding PDN name from the call management table (step S1404). Subsequently, the call control unit 211 sets the PDN number and the packet filter table ID obtained from the call management table as associating with the EPS bearer number and the PDN name previously set at the call management table (step S1405).

Next, the call control unit 211 transmits the packet filter setting request which requests for additionally setting the packet filter entry and the like to the packet filter table to the packet filter processing unit 215 (step S1406). For example, in the example of FIG. 8, the call control unit 211 requests the packet filter processing unit 215 for additional setting of "entry number: 3", "destination TCP port number: 200" and "EPS bearer number: 12" at the packet filter table of "ID=1". Here, the entry number corresponds to the entry ID and the destination TCP port number corresponds to the entry.

Subsequently, the call control unit 211 generates the call establishment notification to be transmitted to the TE 300 (step S1407). Then, the call control unit 211 transmits the call establishment notification transmission request to the transmitting/receiving unit 213 (step S1408). In this manner, the call control unit 211 completes the process.

Here, description returns to step S1403. In a case that the same PDN name does not exist in the call management table as a result of the determination ("NO" in step S1403), the call control unit 211 performs the new PDN number obtaining process (step S1409). Then, the call control unit 211 proceeds to the abovementioned process in step S1407. Here, the call control unit 211 repeats the determination with the determination result of step S1401 being "NO" until the call establishment notification is received from the wireless processing unit 210.

Figure 15:
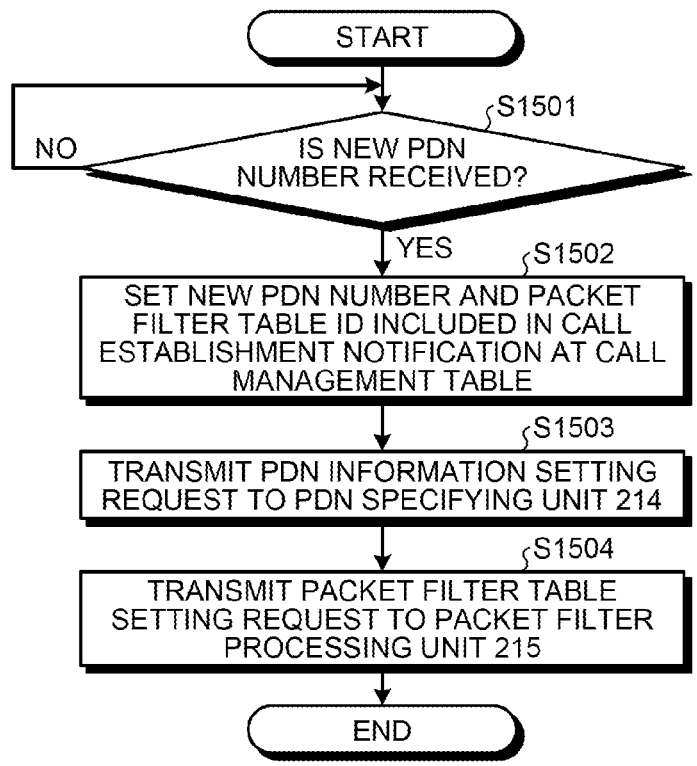
FIG. 15 is a chart illustrating a flow of a process of each process functioning unit included in the mobile equipment according to the second embodiment.

FIG. 15 illustrates a flow of the abovementioned new PDN number obtaining process of step S1409. The new PDN number obtaining process illustrated in FIG. 15 is performed after the call control unit 211 transmits the new PDN number obtaining request to the PDN managing unit 212 and receives the new PDN number from the PDN managing unit 212.

As illustrated in FIG. 15, when the new PDN number is received from the PDN managing unit 212 ("YES" in step S1501), the call control unit 211 performs the process as follows. That is, the call control unit 211 sets the new PDN number and the packet filter table ID included in the call establishment notification as associating with the EPS bearer number and the PDN name previously set at the call management table (step S1502). Then, the call control unit 211 transmits the PDN information setting request to the PDN specifying unit 214 (step S1503). Further, the call control unit 211 transmits the packet filter table setting request to the packet filter processing unit 215 (step S1504). In this manner, the call control unit 211 completes the new PDN number obtaining process. Here, the call control unit 211 repeats the determination with the determination result of step S1501 being "NO" until the new PDN number is received from the PDN managing unit 212.

Figure 16:
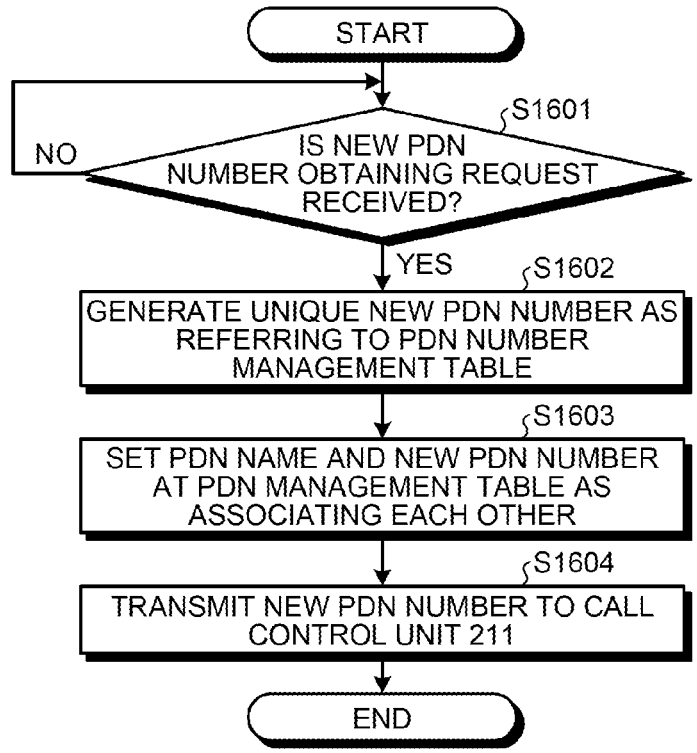
FIG. 16 is a chart illustrating a flow of a process of each process functioning unit included in the mobile equipment according to the second embodiment.

Next, a flow of a process of the PDN managing unit 212 will be described by utilizing FIG. 16. As illustrated in FIG. 16, when the new PDN number obtaining request is received from the call control unit 211 ("YES" in step S1601), the PDN managing unit 212 newly generates a unique PDN number as referring to the PDN management table (step S1602). Next, the PDN managing unit 212 sets the PDN name included in the new PDN number obtaining request and the new PDN number at the PDN management table as associating each other (step S1603). Then, the PDN managing unit 212 transmits the new PDN number to the call control unit 211 as a response to the new PDN number obtaining request (step S1604). In this manner, the PDN managing unit 212 completes the process.

Figure 17:
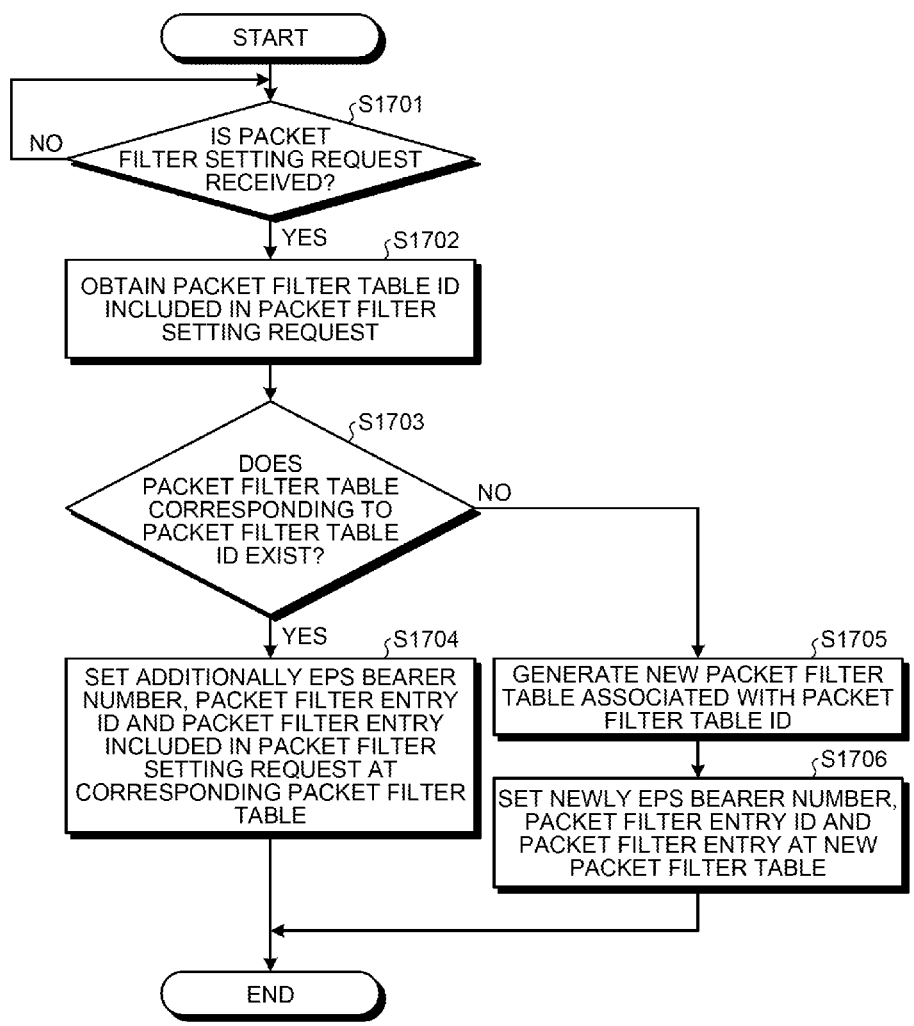
FIG. 17 is a chart illustrating a flow of a process of each process functioning unit included in the mobile equipment according to the second embodiment.

Next, a flow of a process of the packet filter processing unit 215 corresponding to reception of the packet filter setting request will be described by utilizing FIG. 17. As illustrated in FIG. 17, when the packet filter setting request is received from the call control unit 211 ("YES" in step S1701), the packet filter processing unit 215 obtains the EPS bearer number and the packet filter table ID included in the packet filter setting request (step S1702).

Next, the packet filter processing unit 215 determines whether or not the packet filter table corresponding to the obtained packet filter table ID exists (step S1703). In a case that the packet filter table exists as a result of the determination ("YES" in step S1703), the packet filter processing unit 215 performs the process as follows. That is, the packet filter processing unit 215 additionally sets the EPS bearer number, the packet filter entry ID, and the packet filter entry included in the packet filter setting request at the corresponding packet filter table (step S1704).

On the other hand, in a case that the packet filter table does not exist ("NO" in step S1703), the packet filter processing unit 215 generates a new packet filter table which is associated with the packet filter table ID (step S1705).

Then, the packet filter processing unit 215 newly sets the EPS bearer number, the packet filter entry ID, and the packet filter entry included in the packet filter setting request at the newly generated packet filter table (step S1706). In this manner, the packet filter processing unit 215 completes the process. Here, the packet filter processing unit 215 repeats the determination with the determination result of step S1701 being "NO" until the packet filter setting request is received from the call control unit 211.

Figure 18:
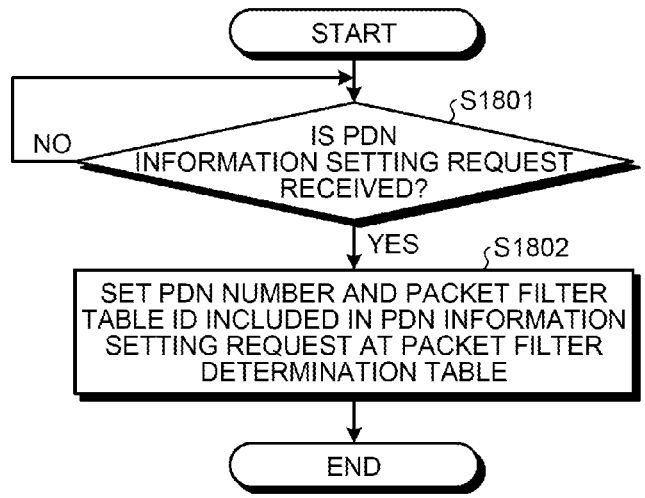
FIG. 18 is a chart illustrating a flow of a process of each process functioning unit included in the mobile equipment according to the second embodiment.

Subsequently, a flow of a process of the PDN specifying unit 214 corresponding to reception of the PDN information setting request will be described by utilizing FIG. 18. As illustrated in FIG. 18, when the PDN information setting request is received from the call control unit 211 ("YES" in step S1801), the PDN specifying unit 214 sets the PDN number and the packet filter table ID included in the PDN information setting request at the packet filter determination table as associating each other (step S1802). In this manner, the PDN specifying unit 214 completes the process. Here, the PDN specifying unit 214 repeats the determination with the determination result of step S1801 being "NO" until the PDN information setting request is received from the call control unit 211.

Figure 19:
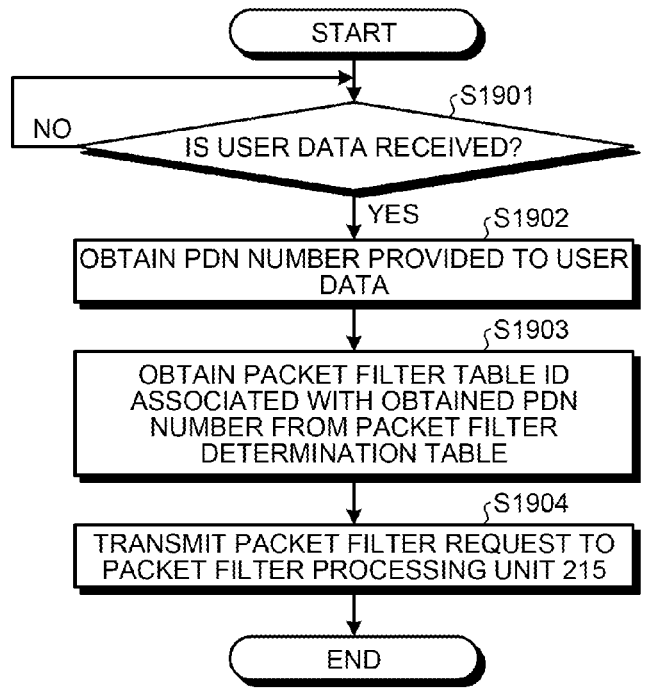
FIG. 19 is a chart illustrating a flow of a process of each process functioning unit included in the mobile equipment according to the second embodiment.

Next, a flow of a process of the PDN specifying unit 214 corresponding to reception of the user data will be described by utilizing FIG. 19. As illustrated in FIG. 19, when the user data is received from the transmitting/receiving unit 213 ("YES" in step S1901), the PDN specifying unit 214 obtains the PDN number provided to the user data (step S1902). Next, the PDN specifying unit 214 obtains the packet filter table ID associated with the obtained PDN number from the packet filter determination table (step S1903). Then, the PDN specifying unit 214 transmits the packet filter request to the packet filter processing unit 215 (step S1904).

In this manner, the PDN specifying unit 214 completes the process. Here the PDN specifying unit 214 repeats the determination with the determination result of the step S1901 being "NO" until the user data is received from the transmitting/receiving unit 213.

Figure 20:
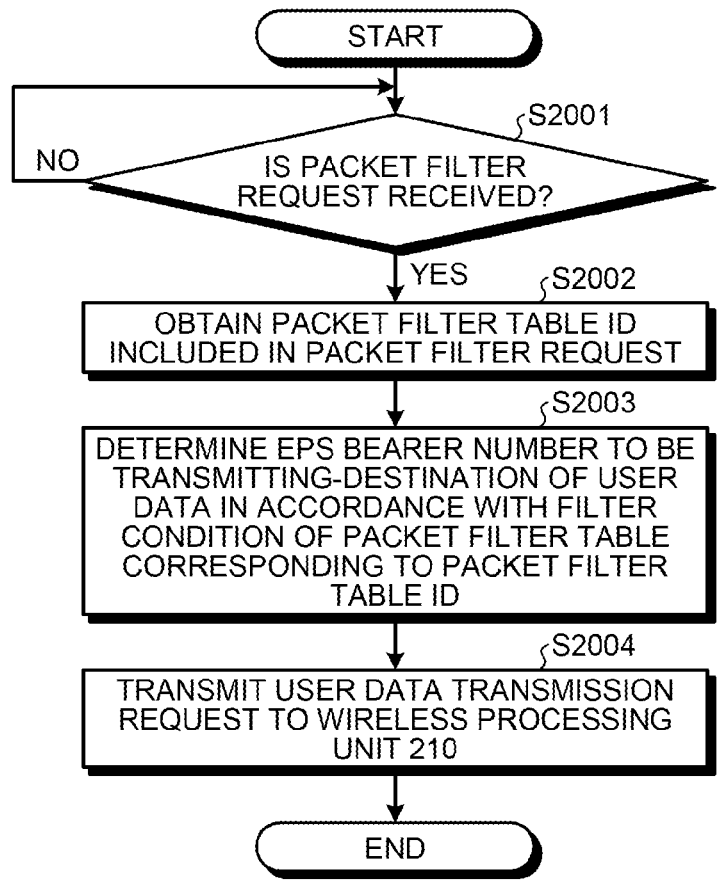
FIG. 20 is a chart illustrating a flow of a process of each process functioning unit included in the mobile equipment according to the second embodiment.

Subsequently, a flow of a process of the packet filter processing unit 215 corresponding to reception of the packet filter request will be described by utilizing FIG. 20. As illustrated in FIG. 20, when the packet filter request is received from the PDN specifying unit 214 ("YES" in step S2001), the packet filter processing unit 215 obtains the packet filter table ID included in the packet filter request (step S2002).

Next, the packet filter processing unit 215 determines the EPS bearer number as comparing the filter condition of the packet filter table of the obtained table ID and the destination IP address of the user data included in the packet filter request (step S2003). Then, the packet filter processing unit 215 transmits the user data transmission request to the wireless processing unit 210 (step S2004).

In this manner, the packet filter processing unit 215 completes the process. Here, the packet filter processing unit 215 repeats the determination with the determination result of step S2001 being "NO" until the packet filter request is received from the PDN specifying unit 214.

Figure 21:
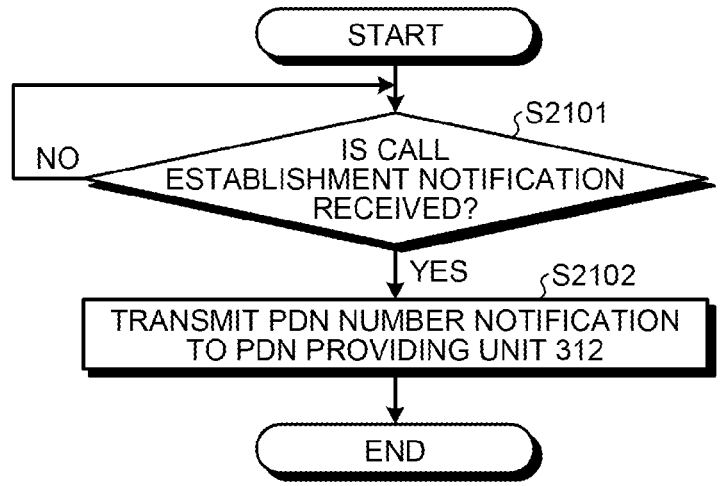
FIG. 21 is a chart illustrating a flow of a process of each process functioning unit included in the mobile equipment according to the second embodiment.

Next, a flow of a process of the call control unit 314 will be described by utilizing FIG. 21. As illustrated in FIG. 21, when the call establishment notification is received from the transmitting/receiving unit 313 ("YES" in step S2101), the call control unit 314 transmits the PDN number notification which includes the PDN name and PDN number included in the call establishment notification to the PDN providing unit 312 (step S2102). In this manner, the call control unit 314 completes the process. Here, the call control unit 314 repeats the determination with the determination result of step S2101 being "NO" until the call establishment notification is received from the transmitting/receiving unit 313.

Figure 22:
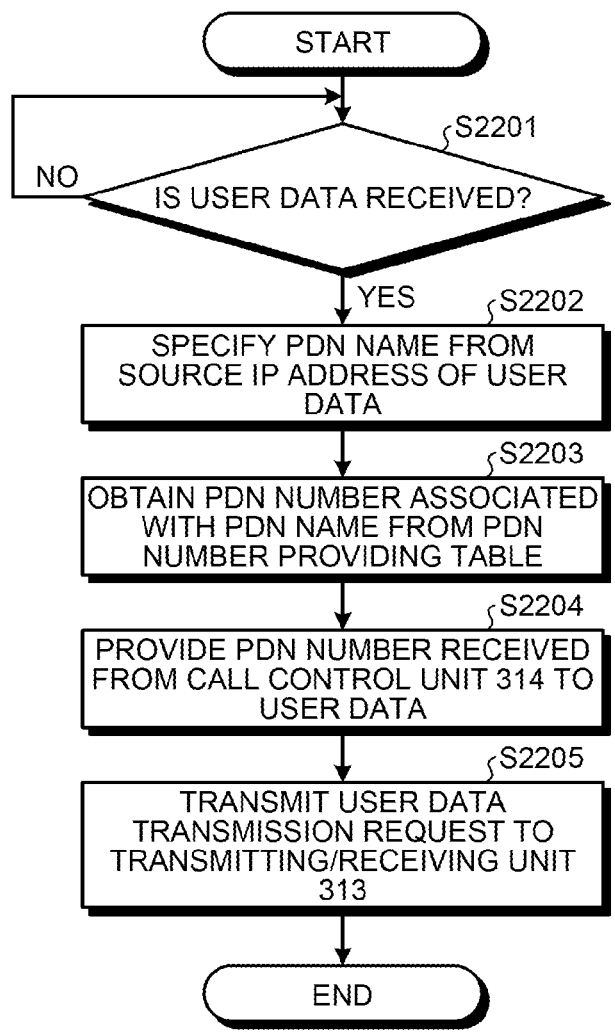
FIG. 22 is a chart illustrating a flow of a process of each process functioning unit included in the mobile equipment according to the second embodiment.

Subsequently, a flow of a process of the PDN providing unit 312 will be described by utilizing FIG. 22. As illustrated in FIG. 22, when the user data is received from the TCP/IP processing unit 311 ("YES" in step S2201), the PDN providing unit 312 obtains the source IP address of the user data and specifies the PDN name based on the obtained IP address (step S2202).

Then, the PDN providing unit 312 obtains the PDN number associated with the specified PDN name from the PDN number providing table (step S2203). Next, the PDN providing unit 312 provides the PDN number obtained from the PDN number providing table to the user data received from the TCP/IP processing unit 311 (step S2204). Subsequently, the PDN providing unit 312 transmits the user data transmission request including the user data to which the PDN number is provided to the transmitting/receiving unit 313 (step S2205). In this manner, the PDN providing unit 312 completes the process.

Here, the PDN providing unit 312 repeats the determination with the determination result of step S2201 being "NO" until the user data is received from the TCP/IP processing unit 311.

Effects of Second Embodiment

As described above, the MT 200 obtains the packet filter table for selecting the EPS bearer number to be used for transferring the user data received from the TE 300 as aggregating for each PDN. Then, the MT 200 transmits the PDN number to the TE 300 and obtains the EPS bearer number to be used for transferring the user data from the packet filter table having the PDN number provided to the user data received from the TE 300 as a key. That is, according to the second embodiment, the packet filter table is mounted on the MT 200 as being aggregated without being mounted on the respective TEs 300. Then, according to the second embodiment, owing to that the PDN number is exchanged between the MT 200 and the TE 300, functions of the packet filter table are ensured. According to the above, for example, even in a case that packet filtering is performed on a plurality of the TEs 300, packet filtering can be appropriately performed without complicating the configuration of the mobile equipment 100.

[c] Third Embodiment

In the following, other embodiments of the mobile equipment, the packet filtering method, and the packet filtering program disclosed in the present application will be described.

(1) Equipment Configuration and the Like

For example, the configuration of the mobile equipment 100 illustrated in FIG. 4 is functionally conceptual and it is not necessarily be physically configured as illustrated in the drawing. For example, the call control unit 211 and the PDN managing unit 212 of the mobile equipment 100 illustrated in FIG. 4 may be integrated functionally or physically. Further, the PDN specifying unit 214 and the packet filter processing unit 215 of the mobile equipment 100 illustrated in FIG. 4 may be integrated functionally or physically. In this manner, it is possible that all or a part of the mobile equipment 100 is separated or integrated functionally or physically for an arbitrary entity in accordance with various loads or usage situations.

(2) Packet Filtering Method

According to the abovementioned embodiments, a packet filtering method including processing steps as described below is actualized. Regarding the mobile equipment 100, the packet filter table is kept aggregated in the MT 200. The packet filtering method applied to the mobile equipment 100 includes a setting step, a transmitting step, and a selecting step.

In the setting step, when the EPS bearer is established against the IP network 3, the PDN number is set for the connecting-destination to be connected with the mobile equipment 100 via the EPS bearer. In the transmitting step, the PDN number set in the setting step is transmitted to the TE 300 which is an establishment requestor of the EPS bearer. In the selecting step, when the user data is received from the TE 300, the packet filter table associated with the PDN number which is provided to the user data is obtained and the EPS bearer is selected based on the obtained packet filter table.

(3) Packet Filtering Program

Further, for example, a variety of processes to be performed by the mobile equipment 100 which is described in the abovementioned embodiment may be actualized by executing a previously-prepared program with an electric device such as a cellular phone and a personal digital assistant (PDA). Here, for example, FIGS. 14 to 22 and the like may be referred for the variety of processes of the mobile equipment 100.

Figure 23:
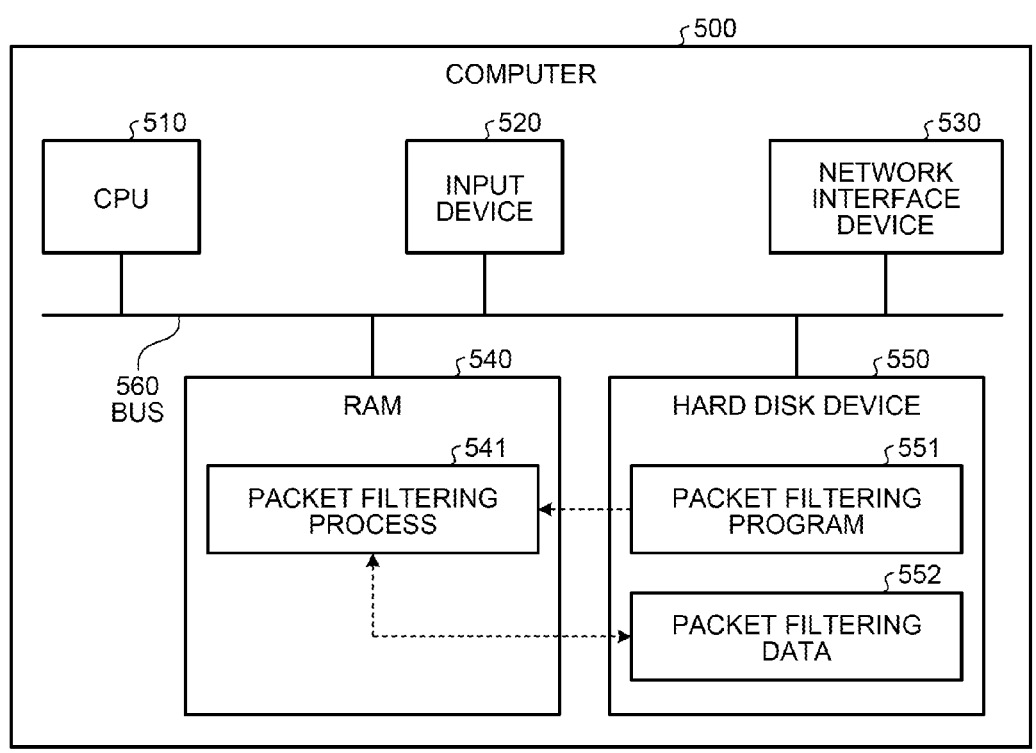
FIG. 23 is a view illustrating an example of a computer which executes a packet filtering program.
Figure 24:
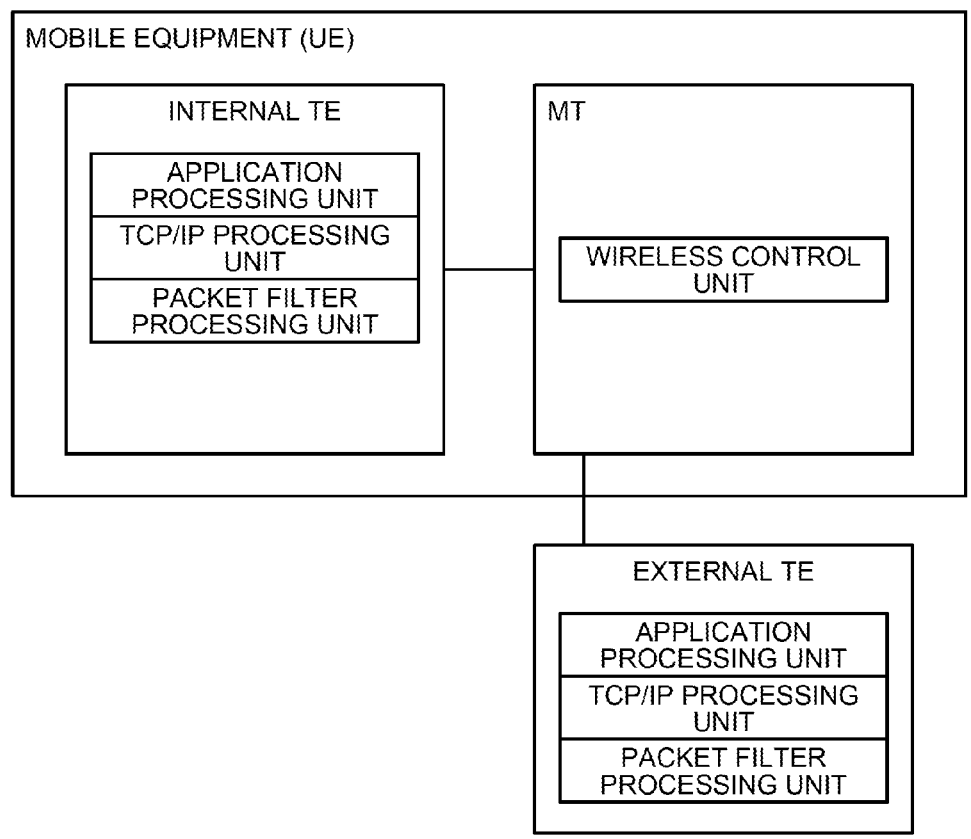
FIG. 24 is a view illustrating an example of a configuration of traditional mobile equipment.

In the following, an example of a computer which executes the packet filtering program to actualize functions similar to the processes performed by the mobile equipment 100 described in the abovementioned embodiment will be described by utilizing FIG. 23. FIG. 23 is a view illustrating an example of the computer which executes the packet filtering program.

As illustrated in FIG. 23, a computer 500 functioning as the mobile equipment 100 includes a central processing unit (CPU) 510 which executes a variety of arithmetic processes and an input device 520 which receives data input from a user.

Further, as illustrated in FIG. 23, the computer 500 includes a network interface device 530 which performs data exchange with another computer via a network. Further, as illustrated in FIG. 23, the computer 500 includes a random access memory (RAM) 540 which temporarily stores various kinds of information and a hard disk device 550. Then, the respective devices 510 to 550 are connected to a bus 560.

Here, the input device 520 is a keyboard, a mouse, or the like, for example. In a case that the input device 520 includes a mouse, a pointing device function may be actualized as cooperating with a monitor 320 (not illustrated). Further, in a case that the input device 520 includes another input device such as a touch pad, as well, the pointing device function may be actualized similarly to the case of the mouse.

Further, instead of the CPU 510, it is also possible to adopt an electronic circuit such as a micro processing unit (MPU) or an integrated circuit such as an application specific integrated circuit (ASIC) and a field programmable gate array (FPGA), for example. Further, instead of the RAM 540, it is also possible to adopt a semiconductor memory element such as a flash memory.

A packet filtering program 551 and packet filtering data 552 which execute functions similar to the abovementioned functions of the mobile equipment 100 are stored in the hard disk device 550. Here, the packet filtering program 551 may also be stored in a storage unit of another computer which is communicably connected via a network as being appropriately separated.

Then, owing to that the CPU 510 reads the packet filtering program 551 from the hard disk device 550 and develops into the RAM 540, the packet filtering program 551 functions as a packet filtering process 541 as illustrated in FIG. 23. The packet filtering process 541 develops a variety of data such as the packet filtering data 552 read from the hard disk device 550 into an area appropriately allocated in the RAM 540 and performs a variety of processes based on the variety of developed data.

Here, the packet filtering process 541 includes the processes performed by the MT 200 and the TE 300 of the mobile equipment 100 illustrated in FIG. 4.

Here, the packet filtering program 551 does not need to be stored in the hard disk device 550 from the beginning. For example, each program is stored in a portable physical medium such as flexible disk (FD), a CD-ROM, a DVD disk, a magnetic optical disk, and an IC card which is inserted to the computer 500. Then, the computer 500 may execute each program as reading therefrom.

Further, each program is stored in another computer (or server) which is connected to the computer 500 via a public line, the internet, a LAN, a WAN or the like. Then, the computer 500 may execute each program as reading therefrom.

According to one aspect of the technology disclosed in the present application, communication control is appropriately performed without complicating a mobile equipment configuration even in a case that communication control is performed for a plurality of TEs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. Mobile equipment comprising:
a second control unit that is connected to a plurality of first control units performing control of an application function, the second control unit performing communication protocol control between the mobile equipment and a communication network, the second control unit comprising
a storage unit that stores selection information for selecting a connection to be used for transferring user data received from the first control unit in accordance with a transmitting-destination of the user data among a plurality of virtual connections established between the mobile equipment and the communication network and connecting-destination specifying information for uniquely specifying a connecting-destination to be the transmitting-destination of the user data, the storage unit associating the selection information and the connecting-destination specifying information with each other;
a setting unit configured to set, when a connection is established between the mobile equipment and the communication network, the connecting-destination specifying information for a connecting-destination to be connected with the mobile equipment via the established connection;
a transmitting unit that transmits the connecting-destination specifying information set by the setting unit to the first control unit having an application being an establishment requestor of the connection; and
a selecting unit that obtains from the storage unit, when user data with a predetermined connecting-destination being a transmitting-destination is received from the first control unit having the application being the establishment requestor of the connection, the selection information associated with the connecting-destination specifying information provided to the user data, and selects a connection based on the obtained selection information.

2. A packet filtering method of mobile equipment, comprising:
storing, in a storage unit, selection information for selecting a connection to be used for transferring user data received from a first control unit in accordance with a transmitting-destination of the user data among a plurality of virtual connections established between the mobile equipment and a communication network and connecting-destination specifying information for uniquely specifying a connecting-destination to be the transmitting-destination of the user data, while associating the selection information and the connecting-destination specifying information with each other, the storage unit being in a second control unit provided in the mobile equipment to perform communication protocol control between the mobile equipment and the communication network and connected to a plurality of first control units performing control of an application function;
setting, by the second control unit, when a connection is established between the mobile equipment and the communication network, the connecting-destination specifying information for a connecting-destination to be connected with the mobile equipment via the established connection;
transmitting, by the second control unit, the connecting-destination specifying information set in the setting to the first controller having an application being an establishment requestor of the connection; and
obtaining, from the storage unit, when user data with a predetermined connecting-destination being a transmitting-destination is received from the first control unit having the application being the establishment requestor of the connection, the selection information associated with the connecting-destination specifying information provided to the user data, and selecting a connection based on the obtained selection information.

3. A non-transitory computer-readable recording medium having stored therein a program for causing a computer, which is mobile equipment, to execute a process for packet filtering, the process comprising:
storing, in a storage unit, selection information for selecting a connection to be used for transferring user data received from a first control unit in accordance with a transmitting-destination of the user data among a plurality of virtual connections established between the mobile equipment and a communication network and connecting-destination specifying information for uniquely specifying a connecting-destination to be the transmitting-destination of the user data, while associating the selection information and the connecting-destination specifying information with each other, the storage unit being in a second control unit provided in the mobile equipment to perform communication protocol control between the mobile equipment and the communication network and connected to a plurality of first control units performing control of an application function;
setting, by the second control unit, when a connection is established between the mobile equipment and the communication network, the connecting-destination specifying information for a connecting-destination to be connected with the mobile equipment via the established connection;

transmitting, by the second control unit, the connecting-destination specifying information set in the setting to the first control unit having an application being an establishment requestor of the connection; and obtaining, from the storage unit, when user data with a predetermined connecting-destination being a transmitting-destination is received from the first control unit having the application being the establishment requestor of the connection, the selection information associated with the connecting-destination specifying information provided to the user data, and selecting a connection based on the obtained selection information.

\* \* \* \* \*